United States Patent [19]

Anderson et al.

[11] Patent Number: 5,814,403
[45] Date of Patent: Sep. 29, 1998

[54] COMPOSITES AND METHODS OF MAKING THE SAME

[75] Inventors: Michael P. Anderson, Gillette; Liza M. Monette, Flemington; John P. Dismukes, Annandale; Shiun Ling, Somerville, all of N.J.; David J. Srolovitz, Ann Arbor, Mich.

[73] Assignee: Exxon Research and Engineering Company, Florham Park, N.J.

[21] Appl. No.: 10,619

[22] Filed: Jan. 28, 1993

Related U.S. Application Data

[63] Continuation of Ser. No. 756,719, Sep. 9, 1991, abandoned.

[51] Int. Cl.$^6$ .................. D02G 3/00; B32B 9/00
[52] U.S. Cl. .................. 428/357; 428/361; 428/368; 428/370; 428/374; 428/382; 428/383; 428/384; 428/389; 428/407; 428/408; 428/902
[58] Field of Search .................. 428/361, 368, 428/370, 374, 382, 383, 384, 389, 407, 408, 902, 357

[56] References Cited

U.S. PATENT DOCUMENTS

| | | | |
|---|---|---|---|
| 4,310,581 | 1/1982 | Felter et al. | 428/109 |
| 4,755,556 | 7/1988 | Harris et al. | 524/609 |
| 4,874,661 | 10/1989 | Browne et al. | 428/902 |
| 4,892,772 | 1/1990 | Su | 428/902 |
| 4,966,801 | 10/1990 | Becker et al. | 428/408 |
| 5,053,263 | 10/1991 | Krone et al. | 428/120 |
| 5,068,142 | 11/1991 | Nose et al. | 428/902 |
| 5,288,555 | 2/1994 | Monette et al. | 428/375 |

*Primary Examiner*—Elizabeth D. Wood
*Attorney, Agent, or Firm*—Jay Simon

[57] ABSTRACT

A computer model calculates a critical aspect ratio for a discontinuous fiber composite having fibers dispersed in a matrix. The critical aspect ratio is a function of the elastic modulus and the cohesive energy of the fiber and the matrix. The composite incorporates physical features such as fiber shape features or additives in the fiber or matrix which adjust the elastic modulus and/or cohesive energy of the fiber, of the matrix or both to a value different than the corresponding value for unmodified fiber material or matrix material. These adjustments are selected so that the critical aspect ratio for the material including the modifications will be less than the corresponding critical aspect ratio for the material without the modifications. The resulting composite provides enhanced load sharing between fiber and matrix.

31 Claims, 6 Drawing Sheets

COMPOSITES AND METHODS OF MAKING THE SAME

This is a continuation of application Ser. No. 07/756,719, filed Sep. 9, 1991, now abandoned.

FIELD OF THE INVENTION

The present invention relates to the field of composite materials, and more particularly relates to composites incorporating fibers as one phase.

BACKGROUND OF THE INVENTION

By definition, composite materials include two or more phases having different physical characteristics. Ordinarily, the phases are made from different materials. Many composites incorporate fibers, typically of a relatively rigid material, in a matrix of another material which ordinarily is less rigid. For example, polymers are often reinforced with fibers of glass, ceramic or carbon, whereas metals may be reinforced with ceramic fibers.

Composites present unique problems not encountered with uniform, single phase materials. Practical processes for producing composite materials and forming them into the desired shapes impose limits and tradeoffs. It is often less expensive to make a fiber reinforced composite using relatively short fibers and with a relatively low ratio fiber volume to matrix volume. Conversely, the physical properties of the composite such as tensile strength and tensile modulus often improve with increasing fiber volume and particularly with increasing fiber length. Design of a composite often involves balancing these competing considerations.

It has long been recognized that the length of the fiber influences the degree to which loads such as tensile loads are borne by the fiber as opposed to the surrounding matrix. This may be illustrated by considering the case of a fiber embedded in a surrounding matrix, the fiber having substantially higher modulus of elongation than the surrounding matrix material, and the entire assembly being subjected to a tensile load in the direction of the fiber. As loads can be transferred to the fiber only through the immediately adjacent matrix material, the total tensile force applied to the fiber is directly related to the load borne by the region of matrix material immediately surrounding the fiber. With a very short fiber, the region of matrix material which immediately surrounds the fiber is relatively small and hence the load transferred to the fiber for a given deformation of the matrix material is also relatively small. Thus, even where the matrix material has deformed to its breaking point, the amount of load transferred to the fiber may be very small. Conversely, for a very long fiber there is substantial region of matrix material surrounding the fiber, and the amount of load transferred to the fiber per unit deformation of the matrix material is correspondingly large. Therefore, substantial loads will be applied to the fiber even at relatively small deformations of the matrix material.

With very short fibers the fibers will remain unbroken when the composite is broken, whereas for very long fibers the fibers will be broken before the composite breaks. The term "critical length" is ordinarily used to refer to the fiber length forming the boundary between these two types of fracture behavior. For fiber lengths less than the critical length the matrix material will break leaving the fibers intact when the composite is stressed to failure, whereas for fiber lengths above the critical length the fibers will break before the matrix material breaks. The length of a fiber is often expressed in terms of its aspect ratio, i.e., the ratio between the length of the fiber in its direction of elongation and the diameter or largest dimension of the fiber in a direction perpendicular to its direction of elongation. The critical length can be stated as a critical aspect ratio.

The critical length and critical aspect ratio depend in large measure upon the physical properties of the fiber material and the matrix material. In general, the degree to which the strength and other properties of a composite can be improved by increasing the fiber length diminishes above the critical length. When working with a given set of materials for which there is a given critical length, it is often inefficient to use fiber lengths far in excess of that given critical length. Such excessive fiber lengths may add to processing problems without correspondingly increasing the properties achieved in the composite material. It would therefore be desirable to know the critical aspect ratio associated with the various combinations of fibers and matrices. Critical lengths can be established by making and testing sample composites, but experimental work of this nature is time consuming and expensive. It would also be desirable to understand the effects of varying material properties on the critical length to a greater degree.

Numerous attempts have been made at predicting the critical aspect ratio. One widely used predictive method is the so-called "shear lag" theory of Cox, BR. J. Appl. Phys. Vol. 3, p. 72 et seq. (1952). The shear lag theory makes certain simplifying assumptions about the system. As discussed in Asloun et al., Stress Transferred in a Single-fiber Composites: Effect of Adhesion, Elastic Modulus of Fiber and Matrix and Polymer Chain Mobility, J. Materials Sci. Vol.24, pp. 1835–1844 (1989) the Cox theory with refinements added by others leads to the conclusion that the critical aspect ratio is proportional to a constant times the square root of the ratio between the tensile elastic modulus of the fiber and the corresponding tensile modulus of the matrix material.

Termonia, J. Materials Sci. Vol. 22, pp. 504–508 (1987) applies a computer based nodal model. The model is based upon geometric conception of fibers embedded in a matrix as a two dimensional system and representation of that two dimensional system as a grid of theoretical points or "nodes" at rectilinear spacings. Node equations relate the forces acting between two adjacent points and the relative positions of these adjacent points. These equations incorporate certain properties of the materials present at those theoretical points. This model is then actuated by applying a theoretical deformation to the entire model and then determining the resulting locations for various nodes, and the deformations from the original starting positions, by a process of repetitive trial and error using known mathematical algorithms for solving large numbers of simultaneous conditions by approximation. Notably, the Termonia article does not disclose the equations relating the forces at individual points to relative deformations between those points. The Termonia paper does not specify explicitly that the particular equations used would interrelate predicted forces between the nodes with any components representing shearing stresses in the fiber and/or matrix material. The Termonia model is further elaborated and discussed in additional articles by the same author, viz., Computer Model For The Elastic Properties Of Short Fiber And Particulate Filled Polymers, J. Materials Sci. Vol. 22, pp. 1733–1736 (1987); Tensile Strength Of Discontinuous Fiber-Reinforced Composites, J. Materials Sci. Vol. 24; and computer Model For The Elastic Properties Of Short Fiber and Particulate Filled Polymers, J. Materials Sci. Vol. 22, pp. 1733–1736.

The Termonia model generally leads to the prediction that the critical length is proportional to a constant times the ratio between the fiber elastic modulus and the matrix elastic modulus. Thus, although the Cox theory and the Termonia nodal model differ in their predication as to the degree to which the critical length will vary with this ratio of elastic moduli, both predict that the critical length will increase monotonically as this ratio increases. Stated another way, both of the Cox and Termonia approaches lead to the conclusion that, all other factors being constant, the critical length always increases as the ratio of elastic moduli increases. All other known theoretical and analytical efforts in the composite art have reached the same general conclusion, the only question being how much of an increase would be observed for a particular increase in this elastic modulus ratio in any given situation.

Although these approaches have provided useful data in some situations, and although successful composites have been designed using assumptions based on these theoretical approaches, there have been needs for further improvements in composite design and in the composites themselves.

SUMMARY OF THE INVENTION

One aspect of the present invention incorporates the realization that accepted beliefs in the prior art—that critical aspect ratio is a monotonic function of elastic modulus ratio—are incorrect. According to this aspect of the present invention, it has now been found that critical aspect ratio (and hence critical length) is a function of the elastic modulus ratio and of the ratio between the cohesive energy of the fiber and the cohesive energy of the matrix, referred to herein as the "cohesive energy ratio". Thus, for any given cohesive energy ratio, there is a particular range of elastic modulus ratios which the critical aspect ratio is at or near its minimum. Materials having these critical aspect ratio minimizing combinations of elastic modulus ratio and cohesive energy ratio represent an optimum set of composites. The concept that the critical aspect ratio is lower for these particular families of composites has significance in many respects. Because the critical aspect ratio for these optimum fiber and matrix combinations is lower than for other fiber and matrix combinations, shorter fibers can be employed while nonetheless exceeding the critical aspect ratio. Stated another way, composites incorporating optimum fiber and matrix combinations according to this aspect of the invention provide better tradeoffs between physical properties and processability than other combinations. This aspect of this invention further includes the realization that typical composites utilized heretofore have been outside of these optimized ranges.

For composites having reasonable cohesive energy ratios, the optimum range of elastic modulus ratio is between about 10 and about 20, preferably between about 13 and about 18, and most preferably about 15. One aspect of the present invention provides composites having elastic modulus ratio within these preferred ranges. Preferably, composites according to this aspect of the invention include a substantially organic matrix material such as a polymer or combination of polymers, and may include polymeric or inorganic fibers such as glass or carbon fibers. The intrinsic physical properties of pure organic polymers and typical fibers ordinarily would provide elastic modulus ratios outside of these preferred ranges. Preferred composites according to this aspect of the invention therefore include physical means for modifying the fiber, the matrix or both to provide apparent physical properties different from the intrinsic properties of the pure materials.

A further aspect of the present invention employs an improved nodal model of a composite to determine critical aspect ratios. This model includes a plurality of notional spaced apart nodes representing points within at least one fiber of finite aspect ratio extending in an elongation direction within a matrix surrounding the fiber. The term "notional" is used in relation to the nodes of the model to denote that the model is not an actual composite but in fact is a representation of a composite such as a computer-based mathematical representation.

The model further includes functions representing the mechanical properties of the fiber and the matrix as interrelations between displacement of each such notional node relative to each adjacent node and the forces or, preferably, the strain energy stored in deformation between these adjacent nodes. That is, the functions relate the relative displacement of each pair of adjacent nodes with forces exerted between these nodes or, preferably, with strain energy. Typically, terms in each such function are based at least in part upon the mechanical properties of the materials notionally present between such nodes. The functions are selected so that the forces between nodes or strain energies predicted by the functions include components representative of shearing stresses in the materials. In a particularly preferred arrangement, the nodes may be arranged in a triangular or pyramidal lattice, and the model may include notional bonds interconnecting nearest-neighbor points in this lattice with one another. The functions may include equations defining the relationship between force or strain energy along each such bond and the length of the bond. Most preferably, the functions also include terms representative of changes in angles between bonds.

Preferred methods in accordance with one aspect of this invention include the step of operating the model by applying at least one deformation in the model so that the model indicates that the composite would fracture under this notional load or deformation. Most preferably, fracture of individual bonds as well as fracture of the composite as a whole, are determined from strain energy considerations. The method desirably includes the step of determining whether fracture of the composite involves fracture of the fiber or fracture of the matrix, and then repeating the operation with the model representing fibers of different lengths until the model shows matrix fracture for fibers of at least a first aspect ratio and fiber fracture for fibers of at least a second aspect ratio. In this fashion, the model predicts a critical aspect ratio.

Methods according to this aspect of the present invention preferably further include the steps of selecting at least one real fiber and at least one real matrix based at least in part upon the results achieved in operation of the model. The fiber and matrix desirably are selected so that the real fiber and real matrix have physical properties substantially corresponding to the physical properties represented by the functions of the model. Preferably the real fibers have an aspect ratio at least above the critical aspect ratio predicted by the model. The method also includes the step of incorporating the real fibers and real matrix in a composite.

Methods according to this aspect of the present invention may further include the step of repeating the operation of the model while varying at least one parameter in the model functions defining a physical property in the model on successive operations, so that the model predicts the critical aspect ratio for a plurality of fiber and matrix combinations having different values of the at least one parameter varied in said successive operation. The step of providing the real fibers and real matrix desirably includes the step of providing the real fiber and real matrix so that their real mechanical properties approximate at least one of the sets of mechanical properties used in the repeated operations of the model, and the fibers have an aspect ratio at least equal to the critical aspect ratio predicted by the model for that set of mechanical properties. Most preferably, a method according to this aspect of the present invention includes the step of selecting from among the plural sets of mechanical properties utilized in the various operations of the model an optimized set of mechanical properties for which the critical aspect ratio is a minimum. That is, the apparent fiber and matrix mechanical properties utilized in the real composite represent those mechanical properties for which the model predicts that the critical aspect ratio is at or close to minimum with respect to at least one of the parameters used in model. Preferably, the parameters used in the model include the elastic modulus ratio of the fiber and the matrix, i.e., the ratio of the elastic modulus of the fiber to the elastic modulus of the matrix, and also include the cohesive energy ratio of the fiber and the matrix, i.e., the ratio of the cohesive energy of the fiber to the cohesive energy of the matrix.

A further aspect of the present invention incorporates the realization that certain analytical equations also predict the critical aspect ratio for various combinations of fiber and matrix physical properties. Therefore, certain methods according to this aspect of the present invention include the step of calculating the critical aspect ratio for various sets of fiber and matrix physical properties and selecting those sets which provide critical aspect ratios at or near a minimum and providing a composite including a fiber and a matrix having the selected set of physical properties.

Yet another aspect of the present invention provide a fiber reinforced composite including fibers and a matrix formed from a fiber material and a matrix material each having intrinsic physical properties. As will be appreciated, the intrinsic physical properties of the fiber material and the matrix material define an intrinsic nodal model critical aspect ratio. That is, the aforementioned model would predict a particular critical aspect ratio for a composite in which the fiber and matrix have physical properties equal to the intrinsic physical properties of the materials, referred to herein as the intrinsic nodal model critical aspect ratio. In a composite according to this aspect of the present invention, at least one of the matrix material and the fibers incorporates physical means for modifying its apparent elastic modulus or its apparent cohesive energy or both, so that the apparent physical properties of the fibers and/or the matrix differ from the intrinsic physical properties of the materials themselves. The apparent physical properties of the fibers and matrix are such that the apparent physical properties define a critical aspect ratio lower than the aforementioned intrinsic critical aspect ratio. Stated another way, if the apparent physical properties of the fibers and/or matrix were used in the nodal model, the resulting critical aspect ratio—referred to herein as the apparent nodal model critical aspect ratio—would be lower than the aforementioned intrinsic nodal model critical aspect ratio. As further discussed below, the physical means used to modify the apparent physical properties of the fiber may include deviations from a simple, straight uniform fiber shape and/or fillers incorporated in the fiber itself, whereas the physical means used to modify the physical properties of the matrix may include fillers or voids in the matrix. Any such filler or void in the fiber or the matrix desirably is of a microscale, i.e., of a scale smaller than the fiber or matrix. In a variant of this approach, the intrinsic and apparent critical aspect ratios may be those defined with referenced aforementioned analytic equations.

Materials according to these aspects of the present invention include features which bring them closer to the aforementioned optimized families of composites than they would otherwise be. In this regard, although one can determine whether or not a material is or is not in accordance with this aspect of the invention by determining the aforementioned intrinsic and apparent critical aspect ratios using the model approach or the analytic equation approach, such a determination is not always necessary to make the material itself.

These aspects of the invention can be utilized to good advantage with various composites, including unidirectional discontinuous composites, i.e., composites in which the fibers extend substantially parallel to one another. Although these aspects of the present invention can be applied to composites made from substantially any fiber and matrix materials, they are especially useful in the case of composites incorporating a substantially organic matrix material, i.e., a material in which the major portion of the matrix is an organic material such as a thermosetting or thermoplastic polymer. Preferred fiber materials include organic polymeric materials such as polyethers polyolefins and aramids, metallic materials and nonmetallic inorganic materials such as glass and carbon fibers.

These and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

A fiber-reinforced composite includes fibers 10 dispersed in a matrix 12. The fibers are elongated bodies having length L and diameter d. Ordinarily, all of the fibers in a composite at least theoretically have the same length L. However, in real composites there are variations in fiber lengths. Accordingly, when the length of the fiber in a real multi-fiber composite is referred to in this disclosure, such reference should be taken as referring to the most probable length of the fibers of the composite, which is ordinarily the median fiber length. Also, the term "diameter" as used with reference to an individual fiber in a composite should be understood as referring to the mean of the external dimensions of the fiber in directions perpendicular to the direction of elongation of the fiber. Most often, fibers used in composites are substantially in the form of circular cylinders and in this case, the diameter as defined herein is simply the diameter as ordinarily understood with reference to a circular cylinder. As in the case of length, references to the diameter of fibers in a real, multifiber composite should be understood as referring to the most probable fiber diameter of the various fibers in the composite. The fibers 10 of the composite in FIG. 1 have an actual aspect ratio $S_{act}$. As used in this disclosure with reference to the fibers in a real composite, the aspect ratio $S_{act}$ of the fibers is the ratio of length to diameter, i.e., $S_{act}$ equals L/d.

Figure 1:
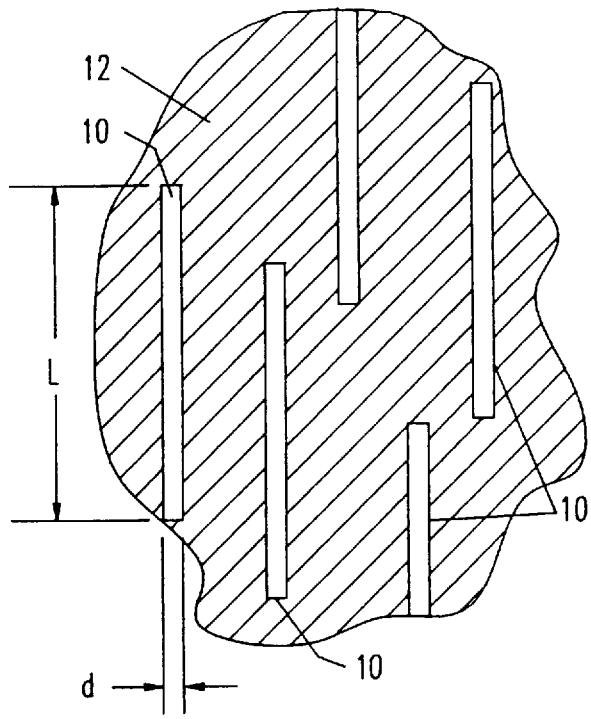
FIG. 1 is a diagrammatic sectional view of a composite.

The composite illustrated in FIG. 1 is a "unidirectional" composite, i.e., the fibers extend generally parallel to one another. The composite of FIG. 1 is also a "discontinuous" fiber composite. That is, the fibers have finite lengths and hence finite aspect ratios. Typically, the lengths of the individual fibers in a discontinuous composite are appreciably less than the external dimensions of the entire composite in the direction of elongation of the fibers.

The degree to which structural loads applied to the composite are taken by the fibers 10 as opposed to the matrix 12 varies with the physical properties of the matrix and the fibers, and with the length of the fibers. As discussed above, for any particular combination of matrix and fiber, there is a critical length $L_c$ such that when a tensile load is applied to the composite in the direction of the fibers, both the fiber and the matrix fracture simultaneously. For fiber lengths below the critical length, the matrix breaks first, whereas for fiber lengths above $L_c$ the fiber breaks first.

Figure 2:
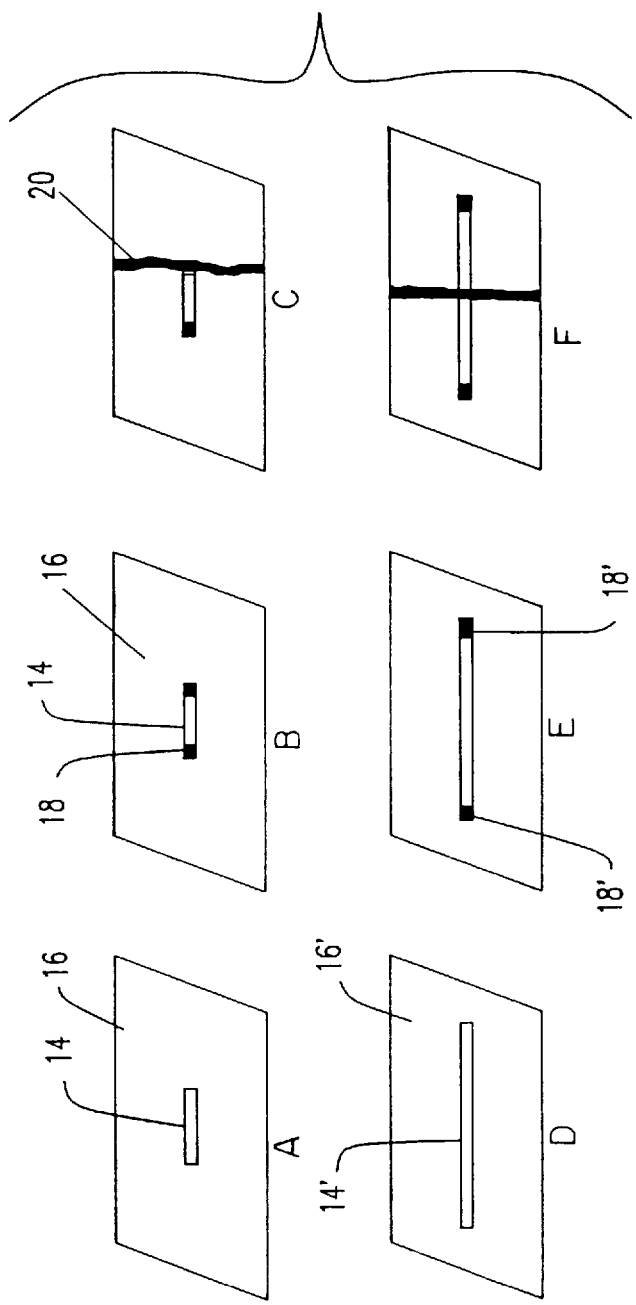
FIG. 2 is a diagrammatic view of idealized composites depicting modes of failure.

Phenomena involved in fracture of a composite are illustrated schematically in FIG. 2 depicting two single fiber composites. The composite in illustrations A, B and C, has a fiber 14 embedded in matrix 16, the fiber having a length less than the critical length for that fiber and matrix combination. Illustration A shows the composite with no load. Illustration B depicts the same composite under tensile load less than the breaking load of the composite. As the tensile modulus $E_f$ of fiber 14 is greater than the tensile modulus of $E_m$ of matrix 16, the fiber is stiffer than the matrix. Therefore, the matrix tends to deform to a greater extent than does the fiber. Stated another way, deformation of the matrix is restrained to some degree by forces transmitted between the fiber and the matrix. These forces transmitted between the matrix and the fiber place the fiber in tension. These forces are limited by deformation of the matrix, and by the relatively low elastic modulus of the matrix. At the ends of the fiber, there is a stress concentration. The stresses transmitted between the matrix and the fiber in this region are extremely high, and there is consequently a zone of local matrix failure 18 at each end of the fiber. As the load on the composite is increased progressively, the forces transmitted between the matrix and the fiber increase, as do the concentrated stresses at the ends of the fiber. The forces transmitted to the fiber, and hence the tensile stress in the fiber increase to only a relatively small degree as the load on the composite increases and the matrix deforms. Therefore the concentrated loads at regions 18 of the matrix adjacent to the ends of the fibers reach the breaking level, and the matrix breaks catastrophically as indicated at 20 before the fiber 14 breaks.

The lower illustrations D, E and F show a similar matrix 16' and fiber 14', fiber 14' being considerably longer than fiber 14. Similar phenomena occur as progressively increasing loads are applied. Thus, concentrated loads are applied to regions 18' of the matrix at the ends of fiber 14', whereas fiber 14' is placed in tension by loads transmitted from the matrix. However, as fiber 14' is relatively long, the tensile loads on the fiber are relatively large compared to the concentrated loads on the matrix, so that fiber 14' reaches its breaking load before catastrophic failure of the matrix occurs at regions 18' (illustration F).

The term "critical length" refers to a particular fiber length $L_c$ such that fibers having length L less than $L_c$ exhibit the matrix break behavior (illustration C) whereas fibers having length L greater than $L_c$ exhibit the fiber break behavior (illustration F). Likewise, for fibers having aspect ratio $S_{act}$ less than $S_c$, the critical aspect ratio, the matrix-only fracture regime prevails. For fibers having $S_{act}$ greater than $S_c$, the fiber fracture regime prevails.

One aspect of the present invention includes the discovery of new analytical equations for predicting $S_c$ for various combinations of fiber and matrix materials, and for predicting the behavior of $S_c$ as the properties of the fiber and matrix vary. Full discussion of the mathematical derivation of these equations is unnecessary to application of the newly discovered relationships. However, the general approach used in deriving these relationships should be understood. The true stress distribution in a multi fiber composite with closely spaced fibers is so complex as to be untreatable by simple mathematical techniques. Accordingly, the new relationships are derived using the simplifying assumption of a "dilute" composite, i.e., a composite for which the stress distribution around each fiber is not influenced by effects prevailing in the vicinity of neighboring fibers. Each fiber in such a dilute composite behaves as if it were the only fiber in a region of the surrounding matrix which can be taken as a cylinder of radius R where R is the distance from the central axis of the fiber at which the strain in the matrix is equal to the average tensile strain of the composite. As discussed further below, R is itself dependent on the properties of the materials. Also, it is assumed in derivation of these relationships that there is no "end adhesion", i.e., that there are no tensile stresses transmitted between the ends of the fibers and the matrix surfaces overlying the ends. It is further assumed that the fiber and the matrix remain elastic, that the interface between the fiber and the matrix is infinitely thin and that there are no strain discontinuities across this interface. That is, it is assumed that the surface of the fiber does not slip relative to the confronting surface of the matrix but rather that each portion of the fiber surface moves to exactly the same extent as the immediately confronting portion of the matrix surface.

The analysis may be conducted either in a three dimensional coordinate system, with a dimension x along the length of the fiber and with two dimensions orthogonal to the length of the fiber and hence orthogonal to the x dimension, or else in a two dimensional coordinate system with the same dimension x along the length of the fiber and only one dimension transverse to the fiber. The two dimensional analysis incorporates the inherent assumption that the fiber and matrix are symmetrical about the length of the fiber, which is a realistic assumption in most cases. The analysis and equations set forth herein utilize the two-dimensional system. The x dimension along the length of the fiber is treated as starting at one end of the fiber, i.e., x equals 0 at one end of the fiber and x equals L, the length of the fiber, at the other end. Given these assumptions, and the normal conditions of equilibrium applied in stress analysis (i.e., that the vector sum of all forces acting on some part of the system must be equal to 0) the relationship between tensile stress in the fiber $\sigma_f$ at any point x along the length of the fiber and the tensile stress in the matrix is $$\sigma_f(x) = \frac{E_f}{E_m} \sigma_m \left[ 1 - \frac{\cosh\beta(x - L/2)/r_f}{\cosh\beta L/2r_f} \right] \qquad (I)$$

In which:

$$\beta = \sqrt{\frac{E_m}{2E_f(1+v_m)(R/r_f-1)}} \quad \text{(II)}$$

In these formulas:

$v_m$ is equal to the Poisson ratio of the matrix;
$E_m$ is the elastic modulus of the matrix;
$E_f$ is the elastic modulus of the fiber;
$r_f$ is equal to the radius of the fiber; and
R is the distance R discussed above.

From similar considerations, the relationship between the shear stress $\tau_i$ prevailing at the matrix-to-fiber interface at any point x along the length of the fiber and the tensile stress in the matrix is given by $$\tau_i(x) = \beta \frac{E_f}{E_m} \sigma_m \left[ \frac{\sinh\beta(x-L/2)/r_f}{\cosh\beta L/2r_f} \right] \quad \text{(III)}$$

One possible assumption is that for a fiber of length L exactly equal to the critical length $L_c$ tensile failure at the midpoint of the fiber occurs simultaneously with tensile failure of the matrix.

That is, both the matrix and the fiber are stressed exactly at their respective breaking stresses, i.e., $\sigma_f$ equals $\sigma_f^*$ and $\sigma_m$ equals $\sigma_m^*$ where $\sigma_f^*$ is the breaking stress of the fiber and $\sigma_m^*$ is the breaking stress of the matrix. The respective breaking stresses of the fiber and the matrix are related to the elastic moduli of these elements and to their respective cohesive energies. Using a "harmonic assumption", i.e., the assumption that the fiber obeys Hooke's Law, the cohesive energy $U_f$ of the fiber is simply $(\sigma_f^*)^2/2E_f$. This equation can be rewritten $$\sigma_f^* = \sqrt{2E_f U_f} \quad \text{(IV)}$$

Likewise, $$\sigma_m^* = \sqrt{2E_m U_m} \quad \text{(V)}$$

Where $U_m$ is the cohesive energy of the matrix. The dimensionless ratio E is defined as $E_f/E_m$, whereas a similar dimensional ratio U equals $U_f/U_m$. Applying these equalities and definitions in formula I above leads directly to the expression:

$$S_c = \frac{1}{\beta} \cosh^{-1}\left[ \frac{E}{E-\sqrt{UE}} \right] \quad \text{(VI)}$$

In which $S_c$ is the critical aspect ratio.

The relationship of formula VI is based on the assumption that pure tensile failure occurs in the matrix. The other possible failure mechanism is that failure is dominated by the shear stresses at the fiber-matrix interface adjacent the ends of the fiber, i.e., that the shear stress of $\tau_i$ at the fiber end (x equals 0) reaches the breaking shear stress $\tau_i^*$ of the matrix when the maximum stress in the fiber reaches the breaking stress of the fiber. With these assumptions, equations I and III yield:

$$\tau_i(x=0) = \tau_i^* = \beta \left[ \frac{\sinh\beta S_c}{\cosh\beta S_c - 1} \right] \sigma_f^* \quad \text{(VII)}$$

In which $\tau_i^*$ is the breaking shear stress of the matrix. However, the breaking shear stress, like the breaking tensile stress of the matrix is related to the cohesive energy of the matrix. Again applying the harmonic or Hooke's Law assumption, $$\tau_i^* = \sqrt{2G_m U_m} \quad \text{(VIII)}$$

Using that equality and formula IV, above, relating the breaking tensile stress of the fiber to its cohesive energy, yields $$S_c = \frac{1}{\beta} \cosh^{-1}\left[ \frac{c+1}{c-1} \right] \quad \text{(IX)}$$

In which:

$$C = \frac{(R/r_f-1)}{U} \neq 1 \quad \text{(X)}$$

Figure 3:
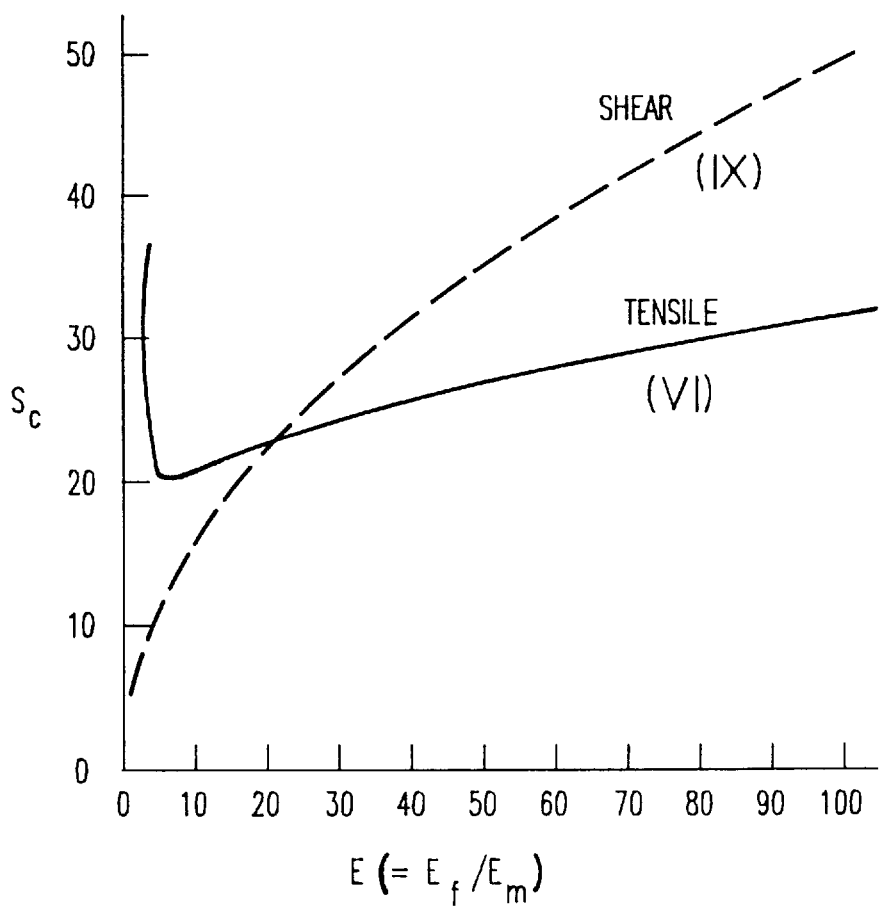
FIG. 3 is a graph showing certain relationships used in some embodiments of present invention.

Thus, formula VI and formula IX are based on different assumptions concerning the mechanism of failure. FIG. 3 illustrates the critical length $S_c$ predicted by these two formulae for a composite having U=2 as E is varied over the range indicated. Clearly, the two possible failure mechanisms lead to different values of the critical aspect ratio $S_c$. The relationship giving the higher value of the critical aspect ratio at any particular value of E (i.e., the curve which is higher at the given value of E) is always taken as defining the analytically derived critical length. Stated another way, for a given value of U at relatively low values of E the critical length is the minimum length of fiber necessary to assure that the fiber reaches its breaking load before the matrix fails in tension, whereas at higher values of E the critical length is the minimum fiber length necessary to assure that fiber reaches its breaking load before the matrix fails in shear at the ends of the fibers.

As used in this disclosure, the term "analytic critical aspect ratio", symbolized by $S_{c,ana}$, for any given combination of material properties ($E_m$, $E_f$, $U_m$, $U_f$ and Poissons ratio $v_m$) should be understood as referring to the critical aspect ratio $S_c$ determined according to formulas VI and IX, whichever gives the higher value. For any value of U, $S_{c,ana}$ has a minimum at a particular value of E. The value of E which gives that minimum is referred to herein as $E_{mins}$.

The results obtained with both formulas IX and VI depend in part upon the value assigned to the parameter R, which is used in calculation of other parameters employed in these formulas. At low values of E, less than or equal to $E_{mins}$ (typically where formula VI gives a higher value than formula IX) R is taken as a constant $R_0$. At higher values of E above $E_{mins}$, R varies approximately in proportion to E, and hence R is taken as equal to $R_1 E$, where $R_1$ is constant. The values of constants $R_0$ and $R_1$ cannot be derived directly, and vary with U. For any given value of U, the value of constants $R_0$ and $R_1$ can be determined from two values of experimentally determined critical length, or from two values of critical length determined according to the nodal model discussed in detail below. In any such set of two values, one should represent E less than $E_{mins}$, whereas one should represent E greater than $E_{mins}$. $R_0$ and $R_1$ can be calculated by substituting the determined critical lengths and the known values of E and U into the equations discussed above. Merely by way of example, for U=2, $R_0$ is about 12 and $R_1$ is about 0.57 when found using the nodal model discussed below. Notably, where $R_0$ and $R_1$ are determined using the nodal model for two values of E, $S_{c,ana}$ determined according to the equations above for other values of E at the same value of U, will be substantially equal to the nodal model critical aspect ratio for these other values. Stated another way, once the analytical equations are calibrated to the nodal model at two points, they yield substantially the same results at other points. Thus, the analytic equations discussed above can be used to calculate the nodal model critical aspect ratio.

Figure 4:
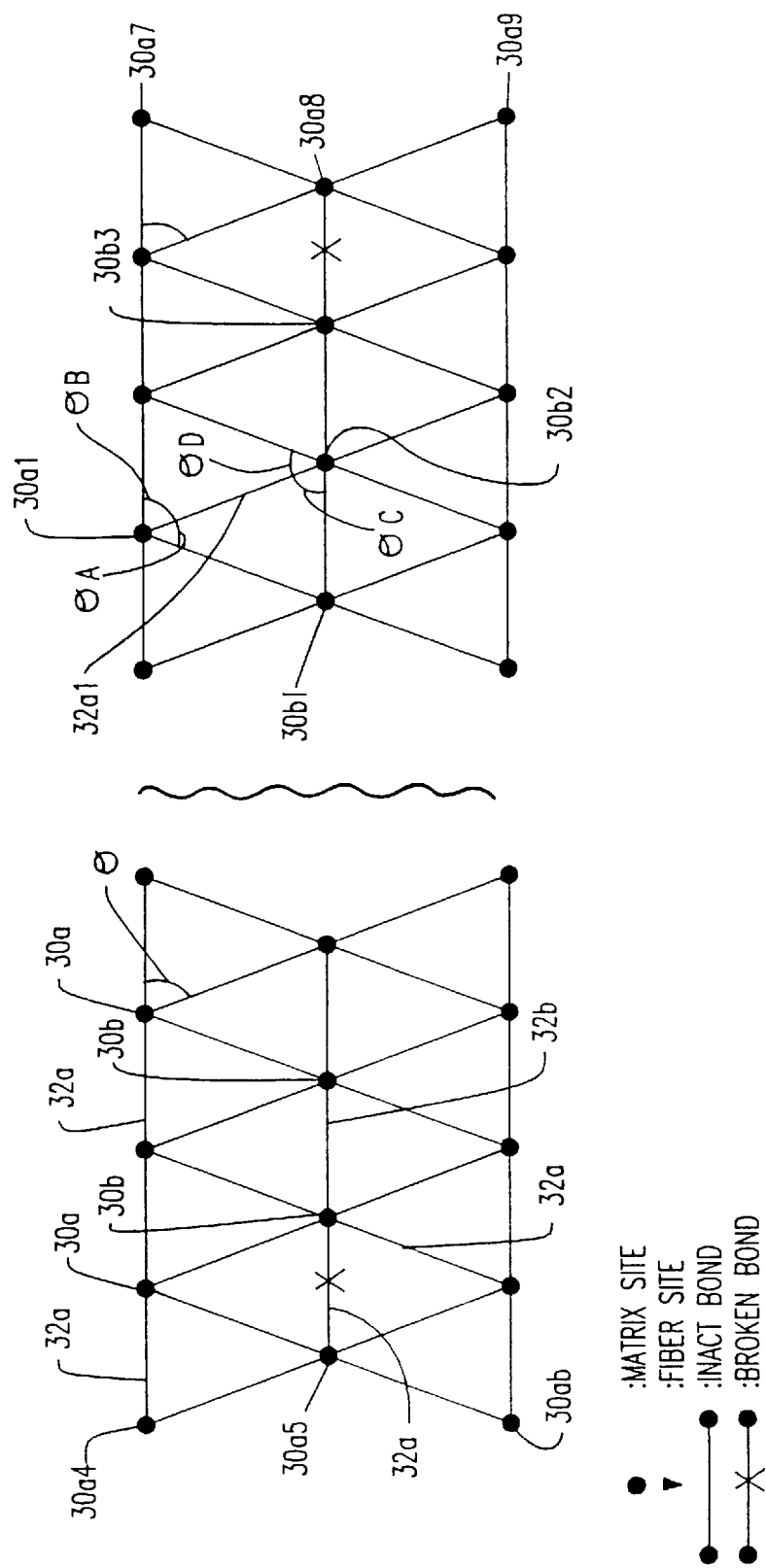
FIG. 4 is a diagram depicting portions of a model used in other embodiments of the invention.

According to a further aspect of the invention, the critical aspect ratio for a composite can be determined by a nodal model. A nodal model as referred to herein is a representation which may be either a physical, structural model or, more preferably, a mathematical model implemented in an analog or, preferably, a digital computer. The assumed geometry of one model in accordance with this aspect of the invention is schematically illustrated in FIG. 4. The model includes a plurality of nodes 30 interconnected by a plurality of bonds 32. Node 30 and bonds 32 are notional, i.e., features of the model which need not exist in physical form but need only exist in the form of representation used in the model. Nodes 30a represent points in a matrix whereas nodes 30b represent points in a fiber. Bonds 32 represent interconnection between nodes 30 as the relationships between relative displacement of the points represented by the nodes and forces acting along the length of lines between these points. The bonds between each node and its nearest neighbor thus represent the mechanical properties of the fiber and the matrix as interrelationships between displacement of each node relative to each adjacent node and forces between these nodes. In the particular scheme shown in FIG. 4, the fiber is modeled as a body of unit diameter, i.e., there is only one row of nodes 30b representing the fiber, whereas the remaining nodes represent the matrix. Also, this particular model illustrated in FIG. 4 is a two dimensional model. Thus, although the real physical fiber is a three dimensional body, it is represented in two dimensions in the mathematical model by only a single layer of nodes. Stated another way, the mathematical model does not include any nodes disposed below or above the plane of the drawing in FIG. 4.

Bonds 32 are treated in the model as tension springs having spring constants proportional to the tensile modulus of the particular material present along the long axis of the bond. Thus, each bond 32a connecting nodes 30a within the matrix or connecting a node 30a of the matrix with a node 30b of the fiber is treated as a spring having spring constant proportional to the elastic modulus of the matrix, whereas bonds 32b extending from one fiber node 30b to another fiber node 30b are treated as having a spring constant proportional to the elastic modulus of the fiber. Stated another way, the force directed along each bond between 32a is taken as equal to $E_m (r-r_0)$ where r represents the length of such a bond under the conditions in question and $r_0$ represents the length of the bond under the starting or zero strain condition. Likewise, for any bond 32b the force along the bond is taken as equal to $E_f (r-r_0)$.

To additionally represent the shear resistance of the matrix material, the model includes torsional or "three body" components. These torsional components can be envisioned as representing torsion springs connected between each pair of intersecting bonds 32. The deformation of each such torsion spring is taken as proportional to the change in the angle $\theta$ between each pair of intersecting bonds, whereas the torsional spring constant is assumed to be one-seventh of the elastic modulus $E_m$ of the matrix material. That is, it is assumed that the shear resistance relates solely to shearing of the matrix material and further assumed that matrix material has a Poisson ratio of 0.1. In this regard, polymer matrices generally have Poisson ratio or $\upsilon_m$ about 0.3, whereas the Poisson ratio or $\upsilon_f$ of real glass fibers typically is about 0.2. However, because the model uses only a single row of nodes to represent the fiber, it implicitly assumes that $\upsilon_f$ is 0. Accordingly, the assumption that $\upsilon m$ is 0.1 preserves the realistic relationship $\upsilon_m - \upsilon_f = 0.1$. Thus, the torsion is given by $c(\theta - \theta_0)$ for each pair of intersecting bonds wherein $\theta$ represents the angle between the intersecting bonds, $\theta_0$ represents the angle between the same bonds at the 0 strain condition and $c = E_m/10$. As will be appreciated, each bond 32 forms part of several such intersections and hence forms part of several such notional torsional springs. Thus bond $32a_1$ forms part of four angles $\theta_A$, $\theta_B$, $\theta_C$ and $\theta_D$. Each such notional angle $\theta$ is a "three body" term in that it is a function of the positions of three nodes. For example, $\theta_A$ in FIG. 4 is a function of the positions of nodes $30a_1$, $30b_1$ and $30b_2$.

The total strain energy in the system is given by:

$$H = \frac{1}{2} E_\alpha \sum_{ij} (r_{ij} - r_o)^2 + \frac{1}{2} c \sum_{ijk} (\cos\theta_{ijk} - \cos\theta_o)^2 \qquad \text{(XI)}$$

in which i, j designates all of the various bonds; i, j, k designates all of the angles; r represents the bond length or distance r between any pair of adjacent nodes i and j; $E_a$ is $E_m$ for i, j designating a matrix bond 32a whereas $E_a$ is $E_f$ for i, j designating a fiber bond 32b; $r_0$ represents the starting lengths of the various bonds, all of which are assumed equal; $\theta_{ijk}$ represents any one of the aforementioned angles, $\theta_0$ represents the starting value of that angle, which is assumed to be 60 degrees; and c represents the aforementioned torsional spring constant, i.e., $E_m/10$.

In the model, energy associated with any individual bond is taken as:

$$h_{bond} = \frac{1}{2} E_a (r - r_0)^2 + \frac{1}{2} \left[ \frac{1}{2} c \Sigma_{ijk=neighbors} (\cos\theta_{ijk} - \cos\theta_0)^2 \right] \qquad \text{(XII)}$$

in which $h_{bond}$ is the energy of the particular bond in question. The expression "ijk=neighbors" indicates that the summation is taken over those angles $\theta$ which are neighbors to the bond in question, i.e., those angles between the bond in question and another bond. For example, with respect with bond 32A1 in FIG. 4, the sum would include terms for $\theta_A$, $\theta_B$, $\theta_C$ and $\theta_D$. Only one-half of the energy associated with each such neighboring angle is attributed to the bond in question in the foregoing formula. Thus, the energy $h_{bond}$ of a particular bond is taken as including the entire energy associated with elongation of that bond and one-half of the energy associated with deformation of each neighboring angle.

Figure 5:
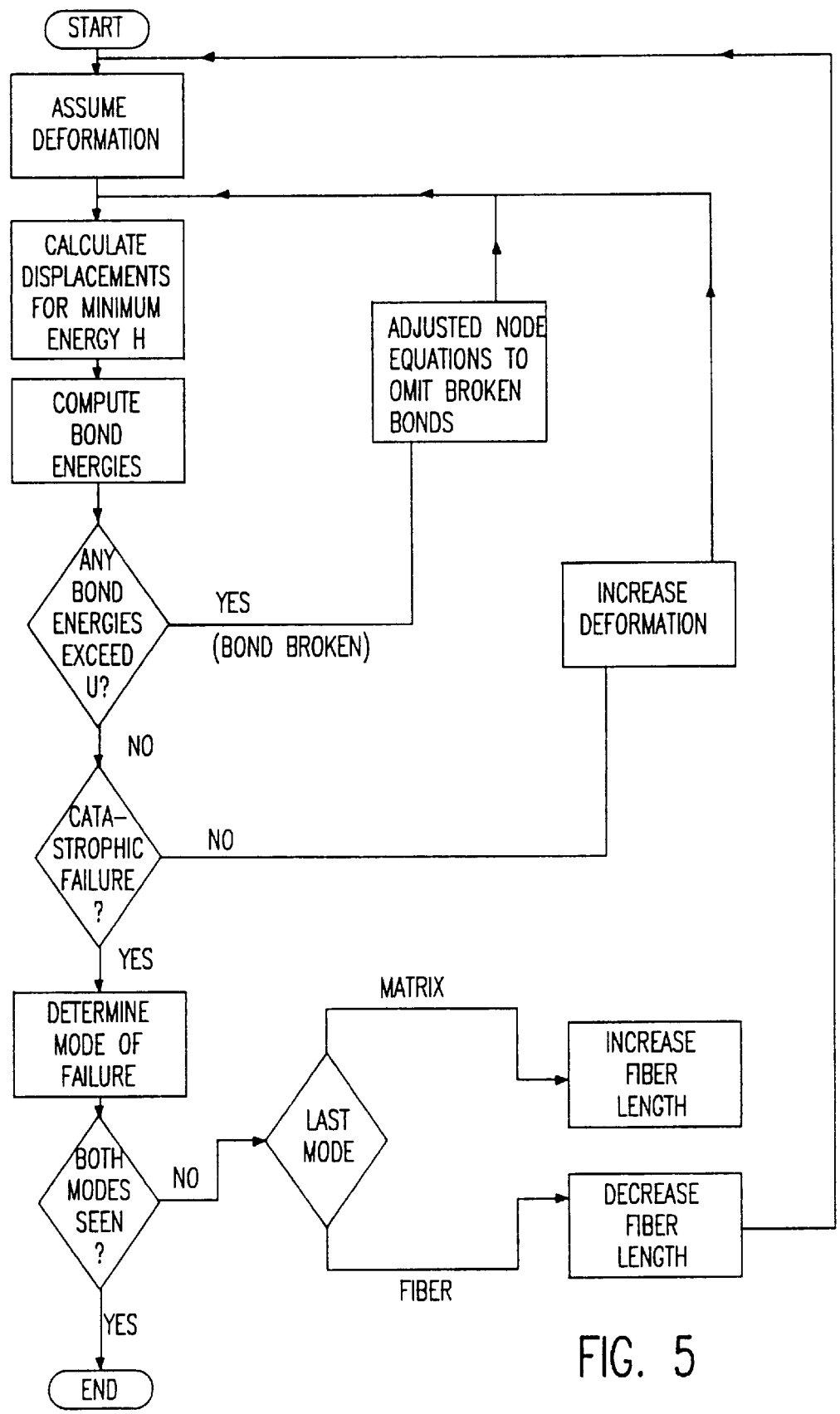
FIG. 5 is an operational flow chart for the model of FIG. 4.

The model is operated according to the general scheme shown in FIG. 5. The fiber length evaluated in any particular run of the model is implicit in the characterization of particular nodes as part of the fiber or part of the matrix. For example, the model could be made to simulate a shorter fiber length by assuming that node $30b_3$ is contained in the matrix rather than in the fiber, and by adjusting some characteristics of the associated bonds accordingly. The properties of the matrix and fiber material are reflected in the assumed values for $E_m$ and for $E_f$, and in values of cohesive energies of the fiber and matrix $U_f$ and $U_m$, which are also assumed. Given those assumptions, the model is cycled through the illustrated operations 5. At the start of the operation, it is assumed that the model structure is deformed to some arbitrarily selected amount. Using the visualization FIG. 4, this would amount to an assumption that nodes $30a_4$, $30a_5$ and $30a_6$ remain in place whereas nodes $30a_7$, $30a_8$ and $30a_9$ are displaced to the right, in the direction of the x or fiber axis direction by the amount corresponding to the arbitrarily selected deformation.

In the next step of the operation, the positions of all of the other nodes are selected to yield the lowest overall strain energy H, according to formula XI. That is, from a universe consisting of all of the possible sets of node positions r in the x and y (cross-axis) directions which are consistent with the assumed deformation and hence consistent with the assumed position of and nodes $30a_4$ at - $30a_6$ and $30a_7$–$30a_9$, the particular set of node positions for which H is at a minimum is found.

As will be appreciated, the value of r and θ for each bond and angle in the model is uniquely determined for each set of node positions, and hence the value of H for each possible set of node positions in the x and y directions is calculable according to formula XII. Stated another way, H is a dependent variable which is a function of all of the positions specifying independent variables, i.e., the x and y position value for all of the nodes. Thus, the problem of selecting the x and y values which give the lowest H value is simply the problem of finding the values for multiple independent variables associated with a minimum value for a function of those independent variables. Mathematical techniques for finding the minimum of a function of multiple independent variables, and finding the values of the independent variables associated with the minimum are well known. These are also referred to as "minimization" techniques. Any such known techniques can be used. Generally, these techniques involve iteration or trial and error, i.e., trying various sets of the independent variable until the particular set which yields the minimum is found. The sets to be tried may be selected according to any one of numerous, known mathematical algorithms. Suitable minimum finding algorithms are disclosed in the text Numerical Recipes, The Art of Scientific Computing, by Press et al., Cambridge University Press, 1986, and particularly in chapter 10 of that text concerning minimization or maximization of functions. The disclosure of said chapter is hereby incorporated by reference herein.

Minimization methods operate in the multi-dimensional space defined by the plural independent variables and proceed by conducting a series of "line minimizations", i.e., by selecting a particular line in that multi dimensional space and moving along that line until at least a local minimum is found. So-called gradient methods use the gradient of the function, i.e., the vector composed of the first partial derivatives of the function in multi dimensional space, as a guide for selecting the directions of the various lines used for these line minimizations. The so-called "steepest descent" method conducts a line minimization in an arbitrary direction and then conducts a further line minimization along a line in the direction of the gradient at that local minimum so as to find yet another local minimum, and repeats the process again and again. Although such an algorithm will eventually converge at the true or global minimum, it is generally less preferred because it is relatively slow. A better, more preferred minimization technique is referred to as the conjugate gradient method. In the conjugate gradient method, successive line minimizations are conducted along a series of directions which are selected such that the succeeding directions are conjugate to one another. That is, the product of a vector in one such direction and a particular matrix referred to as the "Hessian" matrix yields a vector which, when multiplied with the next succeeding vector is zero, and each such directional vector passes through the local minimum along the line in the immediately preceding vector direction. Specific algorithms for performing conjugate gradient minimization are well known and are set forth in the aforementioned Press et al. text, particularly at pages 305–306 thereof.

After selecting the particular node positions which yield the minimum strain energy H for a model as a whole, the next step is to compute the strain energy associated with each bond according to formula XII above. These computed individual bond energies $h_{bond}$ are then individually tested against the appropriate cohesive energy for the particular bond. That is, the bond energy for each matrix bond $32a$ is compared against the cohesive energy $U_m$ for the matrix, whereas the strain energy for the fiber bond is compared against the cohesive energy $U_f$ of the fiber. If the strain energy associated with any particular bond exceeds the cohesive energy associated with that bond, the particular bond is deemed to have broken.

This step of the procedure is directly related to a significant feature of the model. Because the formulas for total strain energy and, particularly, the formula for strain energy associated with a particular bond incorporate terms representing both tensile and shear stresses, the model reflects bond breakage occurring as a result of combined tensile and shear effects. If a bond is found to be broken in this stage of the model operation, the equations defining the model are adjusted to take account of the broken bond. That is, in subsequent calculations it is assumed that the broken bond has 0 tensile modulus and 0 shear modulus so that in subsequent calculations it is assumed that for bonds which are broken, and for angles neighboring broken bonds, $E_a$ and c, respectively, are 0. Stated another way, the structure of the model is readjusted to take account of the broken bonds. After such readjustment, the model returns to the step of calculating the particular positions of the nodes which would yield the minimum total strain energy H. As will be appreciated, these new positions would normally differ from the positions providing the minimum total strain energy with all unbroken bonds.

After recalculation of the minimum, the individual bond energies are calculated once again for the new node positions and once again tested against the appropriate values of U to check for further broken bonds. If further broken bonds are found, the process is repeated again until the calculation of the node displacement as described above yields no further broken bonds. Once this condition is reached (either on the first calculation of the minimum strain energy or on a subsequent calculation after readjustment of the model equations) the result is checked to determine whether or not a catastrophic failure has occurred, i.e., whether a row of broken bonds extend entirely across the matrix. If not, the originally assumed deformation is increased and the aforementioned steps are repeated again.

This cycle of operations is repeated until the model does indicate that a catastrophic failure has occurred. At this point, the model determines from the identities of the broken bonds the mode of failure, i.e., whether failure has occurred in the matrix only or in the fiber as well as in the matrix. After simulating a first catastrophic failure, the model then increases or decrease the fiber length by a preselected increment, which may be a fixed amount or a fixed percentage of the fiber length. If the catastrophic failure observed with the last fiber length used was a matrix-only failure, the model increases the fiber length, whereas if a fiber failure was observed, the model decreases the fiber length. After increasing or decreasing the fiber length, the model repeats the operations discussed above to simulate another catastrophic failure with the new fiber length. This cycle continues until at least one fiber failure and at least one matrix-only failure have been simulated. The critical length or boundary between matrix-only and fiber failures is taken as midway between the highest fiber length giving a matrix-only failure and the lowest fiber length giving a fiber failure. The nodal-model critical-aspect ratio is equal to this critical length divided by the assumed diameter of the fiber. As the particular model at FIG. 4, assumes a unity-diameter fiber, the critical aspect ratio is equal to the critical length. Thus, for any given values of $E_f$, $E_m$, $U_f$ and $U_m$, the model will determine the critical aspect ratio.

The term "nodal model critical aspect ratio" (symbolized $S_{c,nm}$) as used in this disclosure, means the critical aspect ratio determined in this manner using the model described above. More particularly, the nodal model critical aspect ratio $S_{c,nm}$ is a function of the elastic modulus ratio E ($E=E_f/E_m$) and of the cohesive energy ratio U ($U=U_f/U_m$). Thus, the elastic moduli and cohesive energies of the fiber and matrix and more particularly the ratios of these parameters define the nodal model critical aspect ratio.

Figure 6:
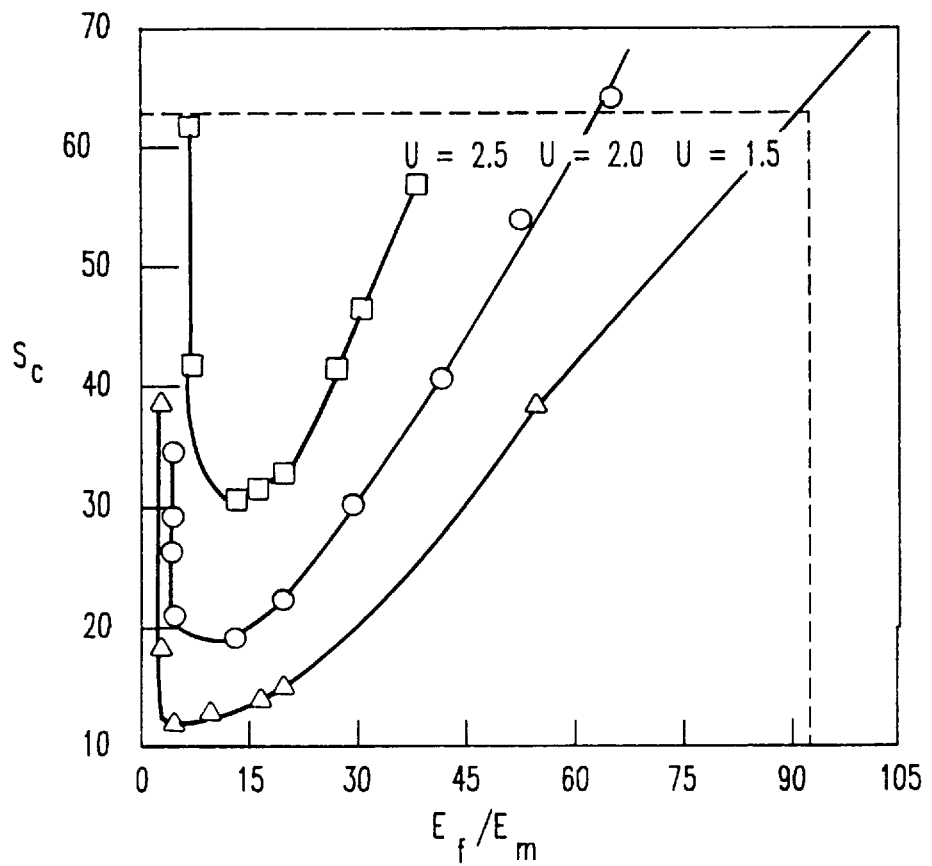
FIG. 6 is a graph showing other relationships used in accordance with certain embodiments of the invention.

The nodal model critical aspect ratio shows substantially the same pattern of variation with U and E as the analytic critical aspect ratio discussed above. That is, for any given value of U, there is a particular range of elastic modulus ratio E for which the critical length is at a minimum. The pattern of variation for both analytic and nodal model critical aspect ratios is illustrated in FIG. 6 for several values of U. In FIG. 6, the value $S_c$ represents the nodal model critical aspect ratio $S_{c,nm}$. As discussed above, where the values of $R_0$ and $R_1$ used in calculation of the analytical critical aspect ratio $S_{c,ana}$ are calibrated to the nodal model, the value of $S_{c,ana}$ will be substantially the same as the value given for the nodal model critical aspect ratio for the same value of U and E.

The dependence of critical aspect ratio on U and E found by the nodal model and analytic methods discussed above provide several highly significant results, which may be exploited according to the invention. The behavior of the analytic critical aspect ratio as E varies is significant. There are distinct minima in the values of $S_{c,ana}$ and $S_{c,nm}$. Although the actual values of $S_{c,ana}$ and $S_{c,nm}$ differ for different values of U, the minima of both $S_{c,ana}$ and $S_{c,nm}$ for reasonable values of U (about 1 to about 5) lie in the range of E of about 10 to about 20 and normally about 13 to about 18. Stated another way, the relationships discussed above show that for materials having attainable ratios of cohesive energies, the fiber and the matrix desirably have $E_f/E_m$ between about 10 and about 20, desirably between about 13 and about 18 and more desirably about 15 so as to provide the lowest critical aspect ratios.

The values for tensile modulus of the fiber ($E_f$) and tensile modulus of the matrix ($E_m$) used in determination of $S_{c,nm}$ and $S_{c,ana}$ can be taken from standard property values reported in known compendia of materials property data. The cohesive energy values for the fiber $U_f$ likewise can be taken from data for fibers of about the diameter normally used in composites, based upon tests of such fibers. This data is commonly available. Where cohesive energy data is derived from tests of fibers, the data ordinarily is not substantially influenced by extraneous factors such as defects in the samples, as typical fibers have a very low concentration of such defects. In particular, glass fibers ordinarily have a relatively low concentration of defects and hence cohesive energy data for glass fibers derived from well conducted breaking tests of the fibers normally reflects the true cohesive energy of the fibers. However, large-volume samples of matrix materials, in the sizes commonly used for engineering physical data property tests on such materials usually incorporate a substantial number of defects. Cohesive energy values derived from tests of such samples typically reflect cohesive energy far lower than that would be achieved by testing a substantially defect-free sample. If a defect-influenced value of $U_m$ were employed in conjunction with a substantially defect-free value for $U_f$, the resultant value of U would not reflect the true ratio of cohesive energies of the fiber and matrix material. A "true" or defect-uninfluenced value of $U_m$ can be derived by fabricating microscale samples of the matrix material, having dimensions similar to those of the fibers, and physically testing the samples.

A true value of the cohesive energy ratio for any combination of fiber material and matrix material, and hence a true value of $U_m$ for the matrix material, can also be derived by physical testing of single fiber dilute composites incorporating the matrix material in question with any fiber material of known $U_f$. The physical tests establish a critical aspect ratio for the system including the matrix material and the known fiber material. That critical aspect ratio, along with the known values of $E_f$ and $U_m$ and values of $S_{c,nm}$ for various combinations of E and U can be used to determine the appropriate value of U. That value in turn can be used along with the known value of $U_f$ to determine $U_m$ for the matrix material.

For example, carbon fibers have $E_f$ of 250 GPa and $U_f$ of 0.0405 GPa, whereas $E_m$ for a pure epoxy resin matrix material is 2.7 GPa. Thus, E for the epoxy matrix/carbon fiber system is 250/2.7 or approximately 92.6. Physical tests show that $S_c$ is approximately 62 for this system. Using these values with the data shown in the curves of FIG. 6 indicates that the cohesive energy ratio U for this system is about 1.5. That is, a system with E of about 92.6 and $S_c$ of about 62 lies on the curve for U=1.5. Accordingly, $1.5 = U_{carbon\ fibers}/U_{epoxy\ matrix}$. Substituting the known value of $U_{carbon\ fibers}$ yields $U_{epoxy\ matrix}=0.027$ GPa. This value of $U_m$ can be used to determine $S_c$ using the analytic equations or nodal model as discussed above, with carbon fibers or with other fibers.

The aforementioned results also provide for guidance in modifying composites. As shown in Table 1, the typical composites utilized prior to the present invention incorporating fibers such as fiberglass or carbon in a polymeric matrix have intrinsic which yield high critical aspect ratios. For example, the nodal

TABLE I

Fiber/Polymer Modulus Ratios for Glass and Carbon Fibers with Typical Thermoplastic and Thermoset Polymers Used in Composites

| | $E_m$ (GPa) | Glass ($E_f$ = 75 GPa) | E (=$E_f/E_m$) Carbon ($E_f$ = 250 GPa) |
|---|---|---|---|
| Thermoplastics | | | |
| PMMA | 2.7 | 28 | 92 |
| Polycarbonate | 2.3 | 33 | 106 |
| Polystyrene | 2.7 | 28 | 92 |
| Thermosets | | | |
| Polyester | 2.0 | 38 | 125 |
| Vinyl Ester | 2.4 | 31 | 104 |
| Epoxy | 2.7 | 28 | 92 | model critical aspect ratio for a composite including carbon fiber ($E_f$=250 GPa, $U_f$=0.091 GPa) in a matrix of epoxy ($E_m$=2.7 GPa, $U_m$=0.027 GPa) is about 62. However, as seen in FIG. 6, theoretical composites having other values of E and/or U have lower critical aspect ratios. For systems having U=1.5, the minimum value of $S_c$ is about 11–12, and occurs at about E=10 to E=15. Stated another way, the epoxy matrix/carbon fiber system is not optimized with respect to critical aspect ratio. With the same pure epoxy-resin matrix but with glass fibers for which $E_f$ equals 250 GPa and $U_f$ equals 0.091 GPa, E is about 28, whereas U is about 3.3. The critical aspect ratio is about 82. However, the minimum $S_{c,nm}$ for composites with U=3.3 is less than 50, and occurs at E=about 11–15. The corresponding values for other, similar composites using other polymeric matrices are likewise far from the minimum attainable values of $S_{c,nm}$.

Figure 7:
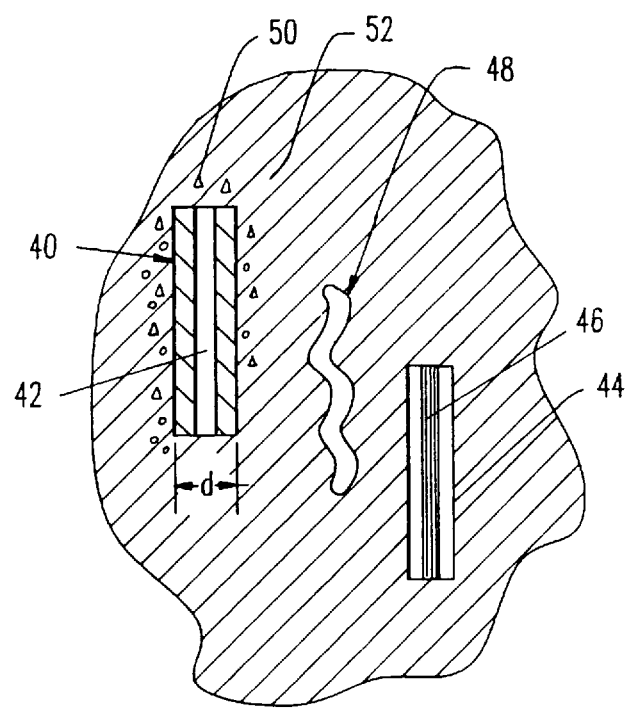
FIG. 7 is a view similar to FIG. 1 but depicting a composite in accordance with a further embodiment of the invention.

According to further aspects of the present invention, the composite may incorporate physical means for modifying the properties of the fiber, or the matrix, or both so that the fiber, matrix or both exhibit apparent properties different from the intrinsic properties of the pure, solid fiber material and of the pure, solid matrix material. This modification is selected so that the critical aspect ratio defined by the apparent properties of the fiber and the matrix is lower than the critical aspect ratio defined by the intrinsic properties of the fiber material and the matrix material themselves. Stated another way, the physical means incorporated in the fiber or the matrix change the way in which these materials act, so that they act as if they had physical properties different from those of the pure, solid materials. Those different physical properties give rise to a lower critical aspect ratio. A hypothetical composite incorporating various physical means which may be used to accomplish this end is illustrated in FIG. 7. One fiber 40 is formed from a fiber material which has an intrinsic tensile modulus $E_{f,int}$. Fiber 40 is hollow and has an interior bore 42. Fiber 40 has a lower spring constant than a solid fiber of the same material. Thus, the fiber acts in the same way as a solid fiber formed from a material having a lower value of $E_f$. This lower value of $E_f$—the value for $E_f$ required to provide a solid cylindrical fiber having the same outside diameter d and tensile spring constant as fiber 40 is referred to herein as the apparent elastic modulus $E_{f,app}$ of fiber 40. Stated another way, fiber 40 acts as if it were a solid fiber formed from material of apparent modulus $E_{f,app}$. Thus, bore 42 modifies the apparent elastic modulus of fiber 40 and effectively reduces it to an apparent value $E_{f,app}$ less than the intrinsic elastic modulus $E_{f,int}$ of the material constituting the fiber. A different fiber 44 includes a core of low modulus material which effectively reduces the intrinsic elastic modulus of the material constituting fiber 44. Yet another fiber 48 incorporates a curved sections which materially reduce the stiffness of the fiber in tension and hence materially reduce the apparent elastic modulus of the fiber. Other fiber configurations may be used to reduce the apparent elastic modulus of the fiber material. For example, the fiber may be formed with voids or the like.

The matrix may also be modified to exhibit an elastic modulus different from the intrinsic elastic modulus of the matrix material itself. For example, small particles of a high modulus filler 50, such as microscale particles having diameters appreciably less than the fiber diameter may be incorporated in the matrix material 52, thereby increasing the apparent elastic modulus of the matrix. As will be apparent from inspection of Table 1 and FIG. 6, in the case of the composite incorporating fibers such as glass or carbon in an organic matrix such as a thermoplastic or thermosetting polymer, it is generally desirable to decrease the elastic modulus of the fibers and increase the elastic modulus of the matrix. In other composites, where the elastic modulus ratio E lies on the low side of minimum range, the reverse modifications may be desirable. It should be appreciated that those modifications which change the apparent elastic modulus of the fiber or the matrix may also change the apparent cohesive energy of one or both components. The resulting set of apparent properties ($E_{f,app}$; $E_{m,app}$; $U_{f,app}$; and $U_{m,app}$) should cooperatively define an apparent nodal model critical aspect ratio $S_{c,nm}$ lower than the intrinsic nodal model critical aspect ratio $S_{c,nm,int}$ defined by the intrinsic properties of the pure fiber and matrix materials themselves. As noted above, $S_{c,nm,int}$ and $S_{c,nm,app}$ be determined either by operation of the model or by use of the analytic equations.

Certain aspects of the invention of course can be implemented without actually performing the calculations. For example, the appropriate modifications can be used even without the calculations, provided that the modifications do in fact result in the correct modification of the materials themselves. Calculations and models as discussed above can be used to determine whether or not a particular modification would be successful or desirable.

The analytic equations and nodal models discussed above can be exploited directly in design and manufacture of composites formed from fibers and matrix of particular apparent properties. This process of composite manufacturing includes calculation of critical aspect ratio by use of such an analytic equations and/or nodal model, with selection of real fiber and matrix apparent properties, and real fiber length to provide real fiber length greater than the predicted critical fiber length determined by the analytic equations or nodal model. The selected fibers and matrix are then incorporated in a real composite by conventional composite-fabrication techniques such as molding or lay-up processes.

The analytic and nodal-model critical aspect ratios discussed above were derived using the assumption of a dilute composite. The actual critical aspect ratio for a concentrated, multi-fiber composite is best approximated by the nodal-model critical aspect ratio multiplied by a scaling factor, typically about 24. Thus, to assure that the fibers will be used efficiently, the aspect ratio of the real fibers in a concentrated composite desirably is about 24 ($S_{c,nm}$) or more. Preferably, the real fiber aspect ratio is less than about 30($S_{c,nm}$) In this regard, it should be noted that the values of E and U which provide minimum critical aspect ratio for the dilute cases should also be workable in the concentrated case. That is, physical properties which provide minimum $S_c$ in the dilute cases diluted above should also provide minimum $S_c$ in concentrated composites.

The nodal model discussed above can be modified to dispense with certain of the assumptions used in the preferred nodal model illustrated. For example, the nodal model can be modified to more closely simulate a multiple fiber, concentrated composite, as by incorporating more nodes representing more fibers. This, however, results in a considerable increase in the computer time required to implement the model. Also, the nodal model can be modified to incorporate additional phases, such as an interphase between the matrix and fiber, the interphase having properties distinct from either the matrix or the fiber. In this case, bonds and angle in the model simulating regions of the composite occupied by the interphase would be assigned appropriate values of $E_a$ and c in formula XI and XII. Also, the particular geometric configuration of nodes illustrated in FIG. 4 is preferred but not essential. Thus, other mathematically equivalent configurations can be employed. For any such other configurations, there would be a formula corresponding to Formula XII but differing in form. Also, although the preferred models are implemented in a digital computer, other modeling techniques can be employed.

As these and other objects, features and advantages of the present invention can be used without departing from the invention as defined in the claims, the foregoing description of the preferred embodiment should be taken by way of illustration rather than by way of limitation of the invention as claimed.

What is claimed is:

1. A discontinuous-fiber composite comprising fibers of finite length formed from a fiber material having intrinsic elastic modulus $E_{f,int}$ and intrinsic cohesive energy $U_{f,int}$ dispersed in a matrix of a matrix material having an intrinsic elastic modulus $E_{m,int}$ and intrinsic cohesive energy $U_{m,int}$, whereby said intrinsic elastic moduli and cohesive energies of said materials define an intrinsic nodal model critical aspect ratio $S_{c,nm,int}$, said fibers having apparent elastic modulus $E_{f,app}$ and apparent cohesive energy $U_{f,app}$, said matrix having apparent elastic modulus $E_{m,app}$ and apparent cohesive energy $U_{m,app}$, whereby said apparent elastic moduli and apparent cohesive energies define an apparent nodal model critical aspect ratio $S_{c,nm,app}$, at least one of said matrix and said fibers incorporating physical means for adjusting at least one of its apparent elastic modulus and cohesive energy to a value different than the corresponding intrinsic value so that $S_{c,nm,app}$ is less than $S_{c,nm,int}$.

2. A composite as claimed in claim 1 wherein $E_{f,int}$ is greater than $E_{m,int}$, and said physical means includes means for adjusting $E_{m,app}$ to a value higher than $E_{m,int}$.

3. A composite as claimed in 2 wherein said means for adjusting $E_m$,app include a particulate filler dispersed in said matrix, said fibers having diameter, said particulate filler consisting of particles having diameter smaller than the diameter of the fibers.

4. A composite as claimed in claim 1 wherein $E_{f,int}$ is greater than $E_{m,int}$ and said physical means includes means for adjusting $E_{f,app}$ so that $E_{f,app}$ is less than $E_{f,int}$.

5. A composite as claim in claim 4 wherein said fibers have shapes other than solid, cylindrical rods, said physical means including said shapes of said fibers, said shapes being such that $E_{f,app}$ is less than $E_{f,int}$.

6. A composite as claimed in claim 5 wherein said fibers are hollow.

7. A composite as claimed in claim 1 wherein said matrix material is an organic material and said fibers material is selected from the group consisting of carbon and glass.

8. A discontinuous composite having fibers of finite length embedded in a matrix, said fibers having apparent elastic modulus $E_{f,app}$ and apparent cohesive energy $U_{f,app}$, said matrix having apparent elastic modulus $E_{m,app}$ and apparent cohesive energy $U_{m,app}$ said apparent elastic moduli and apparent cohesive energies defining an apparent nodal model critical aspect ratio $S_{c,nm,app}$ less than about 25.

9. A discontinuous-fiber composite having fibers of finite length dispersed in a matrix, said fibers having apparent elastic modulus $E_{f,app}$, said matrix having apparent elastic modulus $E_{m,app}$, wherein $E_{f,app}/E_{m,app}$ is about 10 to about 20.

10. A composite as claimed in claim 9 wherein $E_{f,app}/E_{m,app}$ is about 13 to 18.

11. A composite as claimed in claim 10 wherein $E_{f,app}/E_{m,app}$ is about 15.

12. A composite as claimed in claim 9 wherein said fibers include a fiber material having intrinsic elastic modulus $E_{f,int}$ and said matrix includes a matrix material having an intrinsic elastic modulus $E_{m,int}$, $E_{f,app}/E_{m,app}$ being less than $E_{f,int}/E_{m,int}$.

13. A composite as claimed in claim 12 wherein said fiber material is selected from the group consisting of polyethers, aramids, metallic materials and nonmetallic inorganic materials, and said matrix material is selected from the group consisting of organic polymers.

14. A discontinuous fiber composite having fibers of finite length dispersed in a matrix, said fibers having apparent elastic modulus $E_{f,app}$ and apparent cohesive energy $U_{f,app}$, said matrix having apparent elastic modulus $E_{m,app}$ and apparent cohesive energy $U_{m,\ app}$ said apparent elastic moduli and apparent cohesive energies defining an apparent nodal model critical aspect ratio $S_{c,nm,app}$ less than about 25, said fibers having a real aspect ratio $S_{act}$ at least about equal to $S_{c,nm,app}$.

15. A composite as claimed in claim 14 wherein $S_{act}$ is less than about 30 times $S_{c,nm,app}$.

16. A composite as claimed in claim 14 wherein $S_{act}$ is about 24 times $S_{c,nm,app}$.

17. A composite as claimed in claim 16 wherein $E_{f,app}/E_{m,app}$ is between about 10 and about 20.

18. A composite as claimed in claim 17 wherein said fiber material is selected from the group consisting of polyethers, aramids, metallic materials and nonmetallic inorganic materials, and said matrix material is selected from the group consisting of organic polymers.

19. A composite as claimed in claim 18 wherein said fibers extend unidirectionally.

20. A discontinuous fiber composite having fibers of finite length formed from a fiber material dispersed in a matrix formed from a matrix material, said matrix material having an intrinsic elastic modulus, said fiber material having an intrinsic elastic modulus greater than the intrinsic elastic modulus of said matrix material, said fibers being of a shape other than solid cylindrical rods so that said fibers have an apparent elastic modulus smaller than the intrinsic elastic modulus of said fiber material.

21. A composite as claimed in claim 20 wherein said apparent elastic modulus of the fibers is about 13 to about 18 times the apparent elastic modulus of the matrix.

22. A composite as claimed in claim 21 wherein said fiber material is selected from the group consisting of glass and carbon.

23. A composite as claimed in claim 22 wherein said matrix material is selected from the group consisting of organic polymers.

24. A discontinuous fiber composite having fibers of finite length formed from a fiber material dispersed in a matrix formed from a matrix material, said matrix material having an intrinsic elastic modulus, said fiber material having an intrinsic elastic modulus greater than the intrinsic elastic modulus of said matrix material, said fibers being hollow whereby said fibers have an apparent elastic modulus smaller than the intrinsic elastic modulus of said fiber material.

25. A composite as claimed in claim 24 wherein said apparent elastic modulus of the fibers is about 13 to about 18 times the apparent elastic modulus of the matrix.

26. A composite as claimed in claim 25 wherein said fiber material is selected from the group consisting of glass and carbon.

27. A composite as claimed in claim 26 wherein said matrix material is selected from the group consisting of organic polymers.

28. A discontinuous fiber composite having fibers of finite length formed from a fiber material dispersed in a matrix formed from a matrix material together with particles having a diameter smaller than the diameter of the fibers, said matrix material having an intrinsic elastic modulus, said fiber material having an intrinsic elastic modulus greater than the intrinsic elastic modulus of said matrix material, said matrix with particles having an apparent elastic modulus greater than the intrinsic elastic modulus of said matrix material.

29. A composite as claimed in claim 28 wherein said apparent elastic modulus of the fibers is about 13 to about 18 times the apparent elastic modulus of the matrix.

30. A composite as claimed in claim 29 wherein said fiber material is selected from the group consisting of glass and carbon.

31. A composite as claimed in claim 30 wherein said matrix material is selected from the group consisting of organic polymers.

* * * * *